May 31, 1960
H. A. TOULMIN, JR
2,938,566
APPARATUS FOR FORMING SOLID STRUCTURAL MEMBERS
OF GLASS FIBER REINFORCED RESIN
Filed April 26, 1956
3 Sheets-Sheet 1
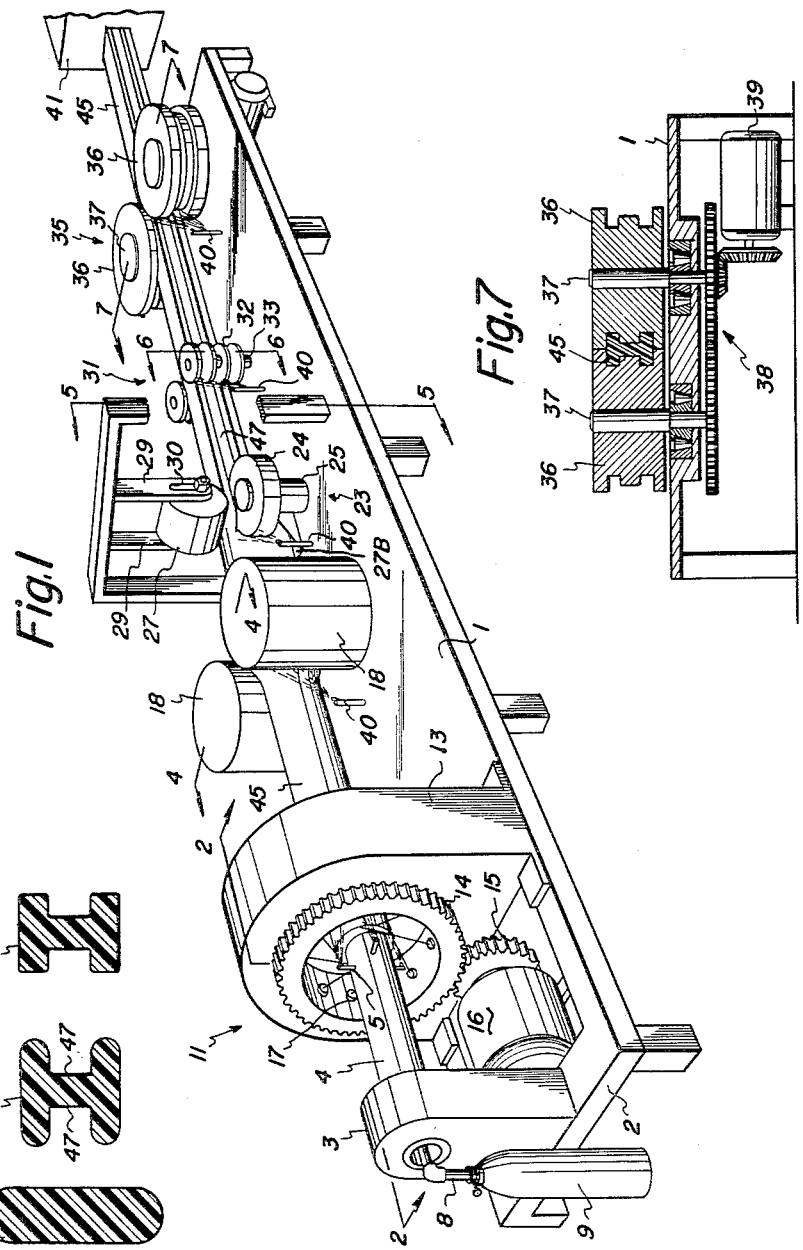
INVENTOR.
HARRY A. TOULMIN, Jr.
BY Toulmin & Toulmin
Attorneys

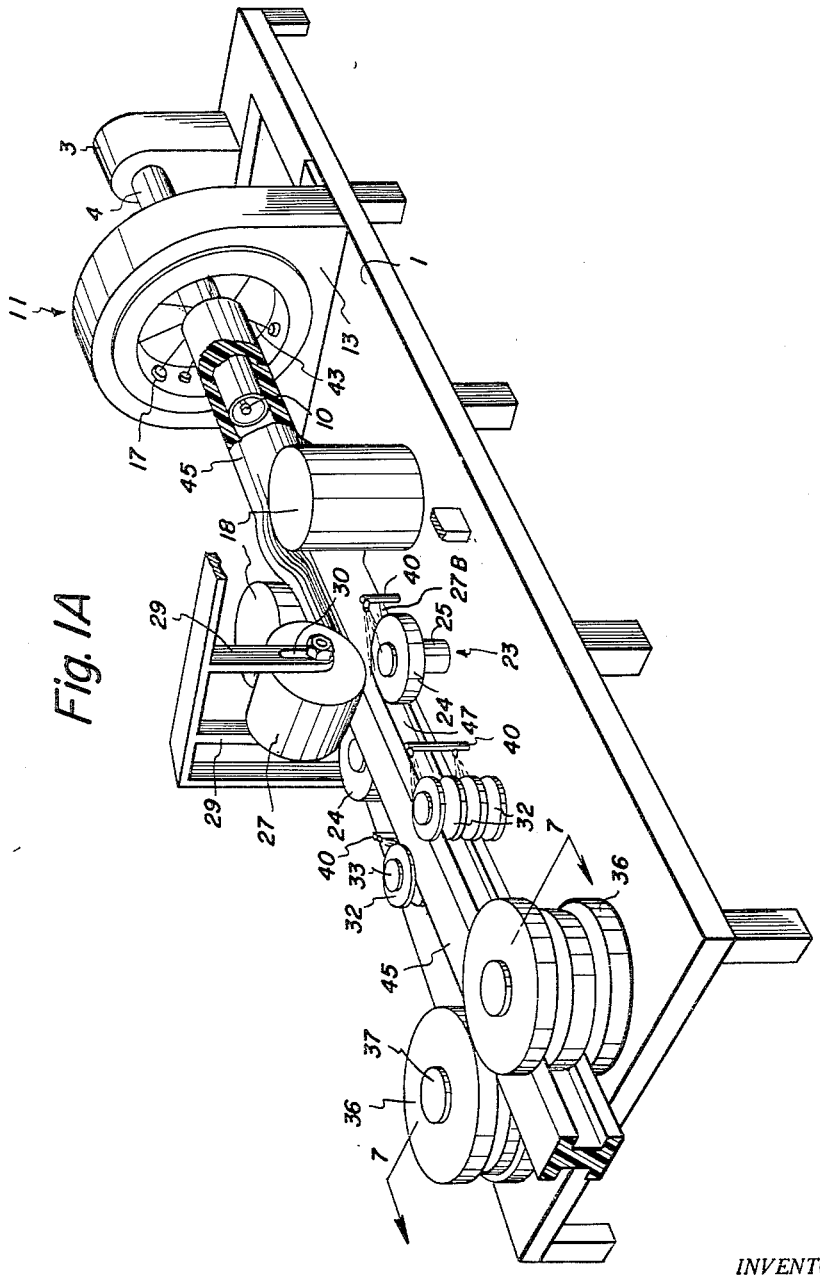

INVENTOR
HARRY A. TOULMIN, Jr.

BY Toulmin & Toulmin

ATTORNEYS

United States Patent Office 2,938,566
Patented May 31, 1960

2,938,566

APPARATUS FOR FORMING SOLID STRUCTURAL MEMBERS OF GLASS FIBER REINFORCED RESIN

Harry A. Toulmin, Jr., Dayton, Ohio, assignor to The Commonwealth Engineering Company of Ohio, Dayton, Ohio, a corporation of Ohio Filed Apr. 26, 1956, Ser. No. 580,900

3 Claims. (Cl. 154—1.8)

The following invention relates to fabricating structural members, more particularly, to a method and apparatus for continuously molding a glass fiber reinforced polyester resin tube into a structural beam having a predetermined section.

It is the principal object of this invention to provide a novel method of forming structural beam members from polyester resins.

It is another object of this invention to provide an improved method of forming polyester resin structural beams having a predetermined section.

It is a further object of this invention to provide a method of forming a polyester I-beam reinforced with fibrous glass.

It is an additional object of this invention to provide an apparatus for rapidly forming polyester resinous beams having predetermined sections.

Many other objects and advantages will become readily apparent upon reference to the accompanying description when taken in conjunction with the following drawings wherein:

Figure 1 is an overall perspective view of the beam forming apparatus of this invention from the tube molding end;

Figure 1A is also an overall perspective view of the beam forming apparatus but looking from the opposite or finishing roller die end of the apparatus;

Figure 7 is a sectional view taken along the lines 7—7 of Figure 1 and showing the finishing roller dies;

Figure 8 (A through D) are transverse sectional views showing the successive sections of the polyester tube as it is being formed into a beam of predetermined sections.

The process of forming a polyester structural beam as disclosed in this invention essentially comprises spraying a fluid polyester resin upon a metallic mandrel to form a tube. A suitable fibrous material is added to the polyester resin as a reinforcing agent. The reinforced polyester tube is then partially set and passed through a series of roller dies which successively form the polyester tube into a structural beam having a predetermined section. The apparatus which is used to accomplish this method shall next be described.

Returning now to the drawings and more particularly to Figure 1 wherein like reference symbols indicate the same parts throughout the various views, 1 indicates an elongated base or bed upon which the apparatus of this invention is mounted. Adjacent one end of the apparatus as indicated at 2 is a vertical support 3. A horizontally supported mandrel or core 4 has one end thereof mounted in the vertical support 3 so that the mandrel is supported as a cantilever beam. The mandrel is made of steel and is cylindrical. The free end of the mandrel is directed toward the opposite end of the base 2, as may be seen in Figure 1.

Figure 2:
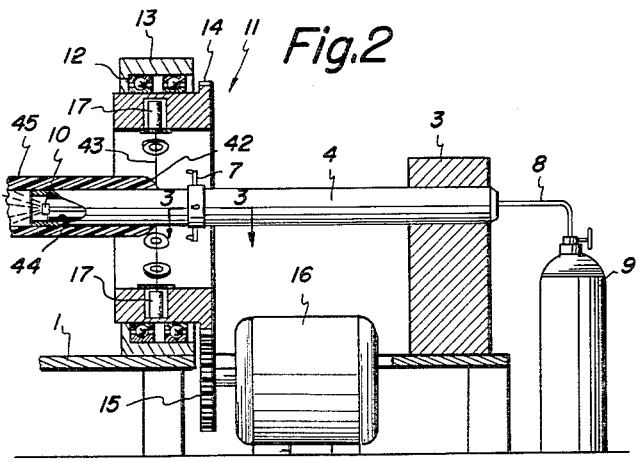
Figure 2 is a sectional view along the lines 2—2 in Figure 1 showing in detail the polyester resinous apparatus and the reinforcing fiber winding device.
Figure 3:
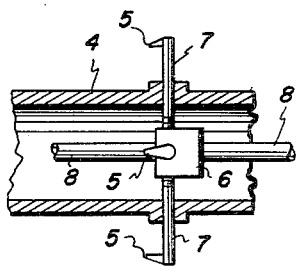
Figure 3 is a sectional view taken along the lines 3—3 of Figure 2 and showing the arrangement of the nozzles for spraying a polyester on the exterior of a mandrel.

A plurality of spaced nozzles 5 are angularly spaced around the mandrel 4 at a point inwardly from the vertical support 3. The nozzles are positioned to direct a stream on the exterior face of the mandrel. The exact positioning of the nozzles is more readily seen in Figure 3.

The nozzles 5 are connected to a distributor box 6 by conduits 7. The distributor box 6 is connected by a conduit 8 to a tank 9 which represents a source of supply of the polyester resin which is to be used in the molding of the tubular member.

A plurality of interior nozzles 10 are placed at the free end of the mandrel 4. These nozzles are also connected to the distribution box 6 and are aimed to direct a stream on the interior face of the plastic tube formed upon the mandrel.

Surrounding the exterior nozzles 5 is a winding drum indicated generally at 11 and journaled within bearings 12 mounted in a support 13. Peripherally arranged gear teeth 14 are adjacent one end of the drum 11. The gear teeth 14 drivingly engage a spur gear 15 which is driven by an electric motor 16 located in the base of the apparatus.

A plurality of spindles 17 are angularly spaced in the interior of the drum 11. A fibrous material in the form of a continuous filament is wound around each of the spindles 17 for winding in the polyester tube in a manner which is to be later described.

Figure 4:
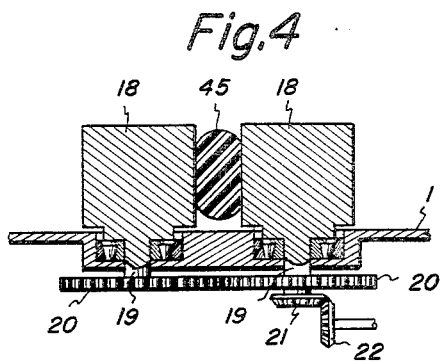
Figure 4 is a sectional view taken along the lines 4—4 of Figure 1.

Mounted upon the base 1 at a point spaced from the winding drum 11 is a pair of spaced cooperating rollers 18 mounted upon vertical spindles 19. The arrangement of the rollers 18 will be more clearly seen in Figure 4. Gears 20 are mounted on the lower ends of the spindles 19 beneath the bed of the apparatus. The gears 20 are in driving engagement with each other. A bevel gear 21 is mounted on the extreme lower end of one of the spindles 19 and drivingly engages a second bevel gear 22 which is driven from a suitable source of power.

The rollers 18 are cylindrical and their precise function will be later explained in the description of the method of this invention.

While the apparatus of this invention may be used for fabricating structural beams of various shapes the apparatus is specifically illustrated as fabricating an I-beam.

In order to fabricate the I-beam, a second stand of roller dies 23 is spaced from the rollers 18. The roller die stand 23 comprises a pair of roller dies 24 which are mounted upon vertical spindles 25. The spindles 25 are journaled at 26 and said journals are mounted in the base of the apparatus. The rollers 24 are shown to be idlers but may be powered.

Also included in the stand 23 is a roller 27 which is mounted upon a horizontally disposed shaft 28. The ends of the shaft 28 are positioned in vertically depending supports 29. Slots 30 are provided in the lower ends of the supports 29 to receive the ends of the shaft 28. Consequently, the vertical position of the roller 27 with respect to the supports 29 may be readily varied.

Figure 5:
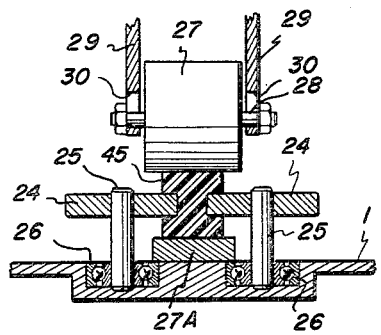
Figure 5 is a sectional view taken along the lines 5—5 of Figure 1.
Figure 6:
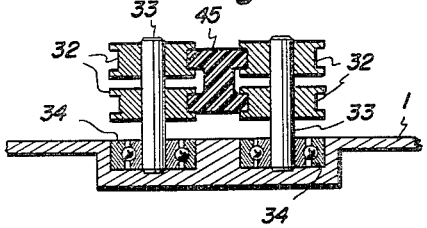
Figure 6 is a sectional view taken along the lines 6—6 of Figure 1.

Mounted on the apparatus base below the horizontal roller 27 and between the vertical rollers 24 is a block 27A which cooperates with the roller 27 in vertically compressing the strip. The block 27A has an inclined face 27B (shown in Figure 1) which guides and compresses the bottom surface of the strip. The block 27A is more clearly shown in Figure 5.

A stand 31 of flange forming rollers 32 is mounted at a point spaced on the stand 23. The rollers 32 are mounted upon vertical spindles 33 the lower ends of which are journaled in bearings 34 supported in the base 1. The flange forming rollers 32 are similarly idlers but may be powered.

A stand 35 of finishing rollers 36 is mounted adjacent the other end of the apparatus base 1. The stand 35 is illustrated in Figure 7 and the rollers therein have a configuration which imparts the final predetermined sectional shape to the beam being fabricated. The rollers 36 are mounted upon vertical spindles 37 the lower ends of which are drivingly connected through suitable gearing 38 to a drive motor 39.

A plurality of polyester sprays 40 are mounted upon the base 1 of the apparatus. The sprays 40 are mounted in pairs and are arranged to spray a polyester resinous material upon the beam immediately prior to the beam entering the set of forming rollers. This added coating of polyester resin lubricates the surface of the beam and enables the beam to pass freely through the forming dies. In addition, a coloring material may be added to the resin emitted from the sprays 40 upon the surface of the structural member for decorative purposes.

A curing oven 41 is located immediately beyond the finishing rollers 36. The length of the oven 41 is sufficient so that the completed structural beam will be cured during its passage through the oven.

In the fabrication of a structural beam in accordance with the method of this invention, a suitable polyester resin is sprayed upon the mandrel through the nozzles 5 to become deposited as indicated at 42. This polyester resin is sprayed in fluid form and is potentially thermosetting. This spray comprises a polymerizable polyester composition which is partial condensation product of at least one unsaturated polyhydric alcohol and at least one polycarboxylic acid or anhydride. The polyester may be an ester of glycol with a dicarboxy alkene having four to five carbon atoms in which the carboxy radicals are attached to adjacent carbon atoms, i.e. maleic, fumaric, itaconic, citraconic, or mesaconic acid, or with the corresponding anhydrides. The precise selection of the polyester will in large part depend upon the ultimate use of the completed structural beam.

Concurrently with the depositing of polyester upon the mandrel a plurality of glass fiber filaments 43 are wound into the deposited polyester resin by the rotating winding drum 11. The reinforcing properties of glass fibers when imbedded in a polyester composition are well known and hence their use is preferable in the structural beam fabricated in this invention. However, textile, metallic, or any other nonmetallic filaments may be readily imbedded in the polyester composition as a reinforcing agent.

The reinforcing filament is in one length and is continuously wound into the deposited polyester resin. If desired, a plurality of short lengths of glass fiber filaments may be deposited by various means such as being blown by a jet of air into the deposited polyester resin. For some purposes, the presence of a large quantity of short lengths of glass fibers may be preferable.

As an alternative, a tubular mat of glass fibers may be built up on the mandrel 4. The nozzles 5 are positioned to spray polyester resin on the complete fibrous mat to impregnate the mat and to bind the fibers together to form a plastic reinforced tube.

Heating coils 44 are mounted in the mandrel 40 in order to preheat the reinforced polyester tube to a temperature which is below the setting temperature of the polyester. This preheating partially condenses the polyester and imparts sufficient strength to the polyester tube to result in the tube being self-supporting.

As an alternative to the heating coils 44 an infrared oven may be positioned at this point with respect to the mandrel 4 to partially condense the polyester tube.

As the preheated polyester tube emerges from the end of the mandrel 4 at 45, it has a cross sectional shape such as illustrated in Figure 8A which is essentially the shape of a cylinder.

As the tube emerges from the mandrel fluid polyester resin may be sprayed on the interior thereof. This will result in the inner surface of the tube being pure resinous material. Consequently, when the walls of the tube are compressed together the inner surfaces of the tube, being resinous material, will readily adhere to each other and the resulting rod-like member will be solid and without a seam therein.

The polyester strip which is indicated generally as 45 throughout its entire processing, is next passed through the rollers 18 where it is compressed into a solid rod-like member. The cross section of the rod-like member at this point is illustrated at Figure 8B and is substantially rectangular. The rollers 18 also move the polyester tube in an axial direction through the various roller dies and remove the polyester tube from the mandrel 4. The compressed polyester strip is then passed through the stand 23 where horizontal grooves 47 are formed in the vertical bases of the strip. The horizontally disposed roller 27 prevents bulging of the polyester strip as the grooves are being formed.

The cross section of the polyester strip at this point is shown in Figure 8C.

The groove in the polyester strip 45 is then passed through the flange forming rollers 32. These rollers roughly shape the flanges of the I-beam.

The shaped polyester strip is next passed through the finishing rollers 36 in which the final shape of the I-beam is formed into the polyester strip. The finished strip is then passed through a suitable heating means, such as an oven, whose temperature is above the setting point of the resin. This is the final heating of the shaped strip and sets the complete I-beam into an infusible condition.

If not already done so during the processing of the I-beam, the beam may be colored or decorated by any suitable process.

Figure 9:
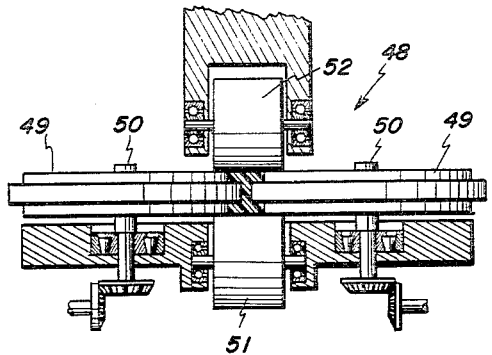
Figure 9 is a vertical sectional view of a modified roller die arrangement which can be readily incorporated in the apparatus as disclosed in Figure 1.

Figure 9 illustrates a modification of the roller die structure which might be used in fabricating the I-beam of this invention. In this modification, all of the forming dies are mounted in a single stand 48 and comprise vertical roller dies 49 mounted on vertical spindles 50 driven from a suitable source of power. The roller dies 49 impart a predetermined configuration to the polyester strip.

Horizontally disposed rollers 51 and 52 compress the upper and lower bases, respectively, of the polyester strip concurrently with the action of the vertical rollers 49. Consequently, when the strip emerges from the modified stand of Figure 9 the beam is in its final shape.

Thus, it can be seen that an apparatus and method has been disclosed for continuously molding a polyester structural beam of a predetermined shape from a tube of a reinforced polyester resin. While the finished product is primarily intended for use as a structural member, it is readily apparent that strips of various sections may be formed by the process of this invention. These strips may be used in locations where no stress is intended to be imparted upon them.

It will be understood that this invention is susceptible to modification in order to adapt it to different usages and conditions, and, accordingly, it is desired to comprehend such modifications within this invention as may fall within the scope of the appended claims.

I claim:
1. In an apparatus for forming a solid structural member from a brittle substantially inextensible fibrous material such as glass the combination of an elongated base, a cylindrical mandrel mounted adjacent one end of said base, a plurality of nozzles spaced around said mandrel for spraying a resinous plastic material thereon, a winding drum surrounding said mandrel and having a plurality of spindles thereon for receiving rolls of filament material for winding the filaments on said mandrel concurrently with the spraying of the resinous plastic material thereon, a pair of parallel rollers on said base spaced from said mandrel for deforming a tubular member formed of said filament and resinous plastic into a solid member, and a plurality of roller stands spaced from said parallel rollers and having die rollers thereon for shaping the solid member into a desired cross-section, said mandrel, parallel rollers and roller stands being aligned so that a tubular member which is being continuously formed on said mandrel will be continuously formed into a substantially straight structural member.

2. In an apparatus for forming a solid structural member from a brittle substantially inextensible fibrous material such as glass the combination of an elongated base, a cylindrical mandrel mounted adjacent one end of said base, a plurality of nozzles spaced around said mandrel for spraying a resinous plastic material thereon, means surrounding said mandrel for winding a plurality of filaments on said mandrel concurrently with the spraying of the resinous plastic material thereon, a pair of parallel rollers on said base spaced from said mandrel for deforming a tubular member formed of said filament and resinous plastic into a solid member, and a plurality of roller stands spaced from said parallel rollers and having die rollers thereon for shaping the solid member into a desired cross-section, said mandrel, parallel rollers and roller stands being aligned so that a tubular member which is being continuously formed on said mandrel will be continuously formed into a substantially straight structural member.

3. In an apparatus for forming a solid structural member from a brittle substantially inextensible fibrous material such as glass the combination of an elongated base, a cylindrical mandrel mounted adjacent one end of said base, a plurality of nozzles spaced around said mandrel for spraying a resinous plastic material thereon, means for partially setting the resinous plastic material as it emerges from the end of said mandrel, a winding drum surrounding said mandrel and having a plurality of spindles thereon for receiving rolls of filament material for winding the filaments on said mandrel concurrently with the spraying of the resinous plastic material thereon, a pair of parallel rollers on said base spaced from said mandrel for deforming a tubular member formed of said filament and resinous plastic into a solid member, and a plurality of roller stands spaced from said parallel rollers and having die rollers thereon for shaping the solid member into a desired cross-section, said mandrel, parallel rollers and roller stands being aligned so that a tubular member which is being continuously formed on said mandrel will be continuously formed into a substantially straight structural member.

References Cited in the file of this patent
UNITED STATES PATENTS

| Number | Name | Date |
|---|---|---|
| 1,421,306 | Rawlings | June 27, 1922 |
| 1,716,505 | Robinson | June 11, 1929 |
| 1,949,476 | Kennedy | Mar. 6, 1934 |
| 2,323,862 | Zimmerman et al. | July 6, 1943 |
| 2,349,829 | Nydegger et al. | May 30, 1944 |
| 2,413,551 | Englund | Dec. 31, 1946 |
| 2,437,884 | Maynard | Mar. 16, 1948 |
| 2,582,294 | Stober | Jan. 15, 1952 |
| 2,614,058 | Francis | Oct. 14, 1952 |
| 2,620,513 | Cryor et al. | Dec. 9, 1952 |
| 2,629,894 | Boggs | Mar. 3, 1953 |
| 2,682,292 | Nagin | June 29, 1954 |
| 2,770,007 | Longstreth et al. | Nov. 13, 1956 |